United States Patent
Zhang et al.

(10) Patent No.: US 12,288,887 B2
(45) Date of Patent: Apr. 29, 2025

(54) CASE HAVING A THERMAL BARRIER LAYER FOR A SINGLE CELL

(71) Applicant: Hefei Gotion High-Tech Power Energy Co., Ltd., Hefei (CN)

(72) Inventors: Ya Zhang, Hefei (CN); Yong Wang, Hefei (CN); Yong Cao, Hefei (CN); Zhihong Lin, Hefei (CN); Qian Cheng, Hefei (CN)

(73) Assignee: Hefei Gotion High-Tech Power Energy Co., Ltd., Hefei (CN)

( * ) Notice: Subject to any disclaimer, the term of this patent is extended or adjusted under 35 U.S.C. 154(b) by 597 days.

(21) Appl. No.: 17/611,091

(22) PCT Filed: May 22, 2019

(86) PCT No.: PCT/CN2019/087926
§ 371 (c)(1),
(2) Date: Nov. 12, 2021

(87) PCT Pub. No.: WO2020/232663
PCT Pub. Date: Nov. 26, 2020

(65) Prior Publication Data
US 2022/0231360 A1    Jul. 21, 2022

(51) Int. Cl.
*H01M 50/124* (2021.01)
*H01M 10/0587* (2010.01)
(Continued)

(52) U.S. Cl.
CPC ... *H01M 50/1245* (2021.01); *H01M 10/0587* (2013.01); *H01M 10/647* (2015.04);
(Continued)

(58) Field of Classification Search
CPC ......... H01M 10/0525; H01M 10/0587; H01M 10/613; H01M 10/647; H01M 10/653;
(Continued)

(56) References Cited

U.S. PATENT DOCUMENTS

2009/0053069 A1    2/2009  Barnikel et al.
2009/0311508 A1   12/2009  Stamm
(Continued)

FOREIGN PATENT DOCUMENTS

CN    101198713 A    6/2008
CN    101611171 A   12/2009
(Continued)

OTHER PUBLICATIONS

Machine translation CN108859282A (Year: 2018).*
(Continued)

*Primary Examiner* — Victoria H Lynch
(74) *Attorney, Agent, or Firm* — LOZA & LOZA, LLP; Michael F. Fedrick

(57) ABSTRACT

The present invention relates to a case having a thermal barrier layer for a single cell. The composite case comprises a substrate and a double-layer structure coating on the substrate, wherein the double-layer structure coating includes an inner layer containing an aerogel material which has a ultra-low thermal conductivity, and an outer layer containing a barrier material which may prevent an electrolyte solvent from permeating into the inner layer. According to the present invention, the composite case can preserve cases in a prismatic or pouch cell from melting when cell goes to thermal runaway.

18 Claims, 3 Drawing Sheets

(51) Int. Cl.
  *H01M 10/647* (2014.01)
  *H01M 10/653* (2014.01)
  *H01M 50/103* (2021.01)
  *H01M 50/105* (2021.01)
  *H01M 50/119* (2021.01)
  *H01M 50/126* (2021.01)

(52) U.S. Cl.
  CPC ....... *H01M 10/653* (2015.04); *H01M 50/103* (2021.01); *H01M 50/105* (2021.01); *H01M 50/119* (2021.01); *H01M 50/126* (2021.01)

(58) Field of Classification Search
  CPC ............. H01M 10/658; H01M 50/103; H01M 50/105; H01M 50/119; H01M 50/121; H01M 50/1243; H01M 50/1245; H01M 50/126; H01M 50/128; H01M 50/133; Y02E 60/10
  See application file for complete search history.

(56) References Cited

U.S. PATENT DOCUMENTS

| | | | |
|---|---|---|---|
| 2011/0159340 A1 | 6/2011 | Hu et al. | |
| 2016/0380244 A1 | 12/2016 | Evans et al. | |
| 2017/0352935 A1 | 12/2017 | Perdu et al. | |
| 2018/0251645 A1* | 9/2018 | Magdassi | C09D 11/101 |
| 2019/0089027 A1* | 3/2019 | Sultenfuss | H01M 10/653 |

FOREIGN PATENT DOCUMENTS

| | | | | |
|---|---|---|---|---|
| CN | 102328779 A | | 1/2012 | |
| CN | 102928460 A | | 2/2013 | |
| CN | 107681067 A | | 2/2018 | |
| CN | 108859282 A | * 11/2018 | ............. B32B 27/06 |
| KR | 1020180013554 A | | 8/2019 | |
| WO | 2017106524 A1 | | 6/2017 | |
| WO | 2018010936 A1 | | 1/2018 | |

OTHER PUBLICATIONS

First Office Action for corresponding European Patent Application No. 19929426.5, dated Nov. 16, 2023.
Kwon, Y-G et al. "Ambient-Dried Silica Aerogel Doped With Ti02 Powder For Thermal Insulation", Journal Of Material Science, vol. 35, No. 24, pp. 6075-6079 (2000).
International search report issued for counterpart Chinese patent application No. PCT/CN2019/087926, mailed on Feb. 19, 2020.
Extended European Search Report issued on Feb. 9, 2023 for counterpart European Patent Application No. 19929426.5, 9 pgs.
First Office Action issued for corresponding Japanese Patent Application 2021-569024 mailed on Apr. 26, 2022.
Second Office Action for corresponding European Patent Application No. 19929426.5, dated Jul. 3, 2024.

* cited by examiner

CASE HAVING A THERMAL BARRIER LAYER FOR A SINGLE CELL

CROSS-REFERENCE TO RELATED APPLICATIONS

This application is the U.S. national stage of International Patent Application No. PCT/CN2019/087926, filed on May 22, 2019 and entitled A CASE HAVING A THERMAL BARRIER LAYER FOR A SINGLE CELL, the disclosures of which are incorporated by reference herein.

TECHNICAL FIELD

The present invention relates to a case having a thermal barrier layer for a single cell, in particular, to a thermal barrier layer inside of a case for a single cell, which can preserve cases in a prismatic or pouch cell from melting when cell goes to thermal runaway.

BACKGROUND ART

Over the last two decades, lithium ion batteries have become highly desired power source for new energy vehicle. The current commercially available lithium ion batteries with a graphite anode and layer-structure LIMO (M=Ni, Co, Mn binary or ternary system) cathode have a gravimetric energy more than 250 Wh/kg at the cell level. The industry is continuously pursing for even higher energy density (>300 Wh/kg).

Comparing with lithium iron phosphate batteries with lower energy density (160-180 Wh/kg), a high-nickel lithium metal oxide, which may be an NCM based battery in which the metal is nickel, cobalt, manganese, or an NCA based battery in which the metal is nickel, cobalt, aluminum, have great advantages in terms of high energy density. However, such batteries have a big safety problem due to the high composition of chemical active substance. When a cell therein suffers from high temperature, overcharging, or internal short, it may get into thermal runaway.

In such a situation, a pressurized atmosphere is present in a single cell which may get into thermal runaway. If the pressure inside the single cell is too high, the cell may explode. Thus, a vent gas direction is designed conventionally in a single cell to reduce the pressure when it goes thermal runaway. Generally, the vent gas direction refers to a relief valve which is arranged on the top of a single cell. The relief valve may be opened when the pressure inside the cell is too high, so that the internal pressure may be reduced by venting gas through the relief valve. The excessive heat in the single cell may be also dissipated by venting gas outside the single cell.

However, in a high energy-density cell, the internal temperature in the single cell may rise to 700° C.-800° C., which may melt and damage the outer aluminum case before the relief valve is opened and directly induce thermal propagation to the neighboring cell. In the other hand, even if the relief valve is opened before the aluminum case is melted, a safety problem that the liquid electrolyte leaks through the relief valve occurs.

The molten aluminum case may result in problems such as leaking and spattering of the liquid electrolyte at high temperature, which may cause direct thermal propagation. Generally, a thermal barrier may be provided between single cells in a cell pack, which may help to vent gas, and stop the neighboring cells from thermal runaway. However, when the aluminum case is melted, the thermal barrier cannot stop the thermal propagation in an effective way.

On the other hand, a pouch cell without a hard metal case generally has no relief valve since it is hard to control the pressure inside, which makes it more difficult to stop the melting of its outer case and thermal propagation when the cell goes thermal runaway.

Many efforts are attempted in the prior art to provide a cell case having multi-layer structure that is flame resistant. For example, CN 102328779 A discloses a soft cell case having multiple layers, which has high temperature resistance and barrier property. Although the soft cell case has a good barrier property to the electrolyte in the cell, it only has a resistance to a temperature as high as about 200° C., thus cannot be used in a high energy-density cell.

Therefore, it is important to preserve the case in a single cell from melting when the cell goes thermal runaway, especially in a high energy-density cell.

SUMMARY OF THIS INVENTION

The present invention is made in view of the above technical problems. A unique design is made in the present invention to solve the problem of thermal propagation between cells. In one aspect, an objective of the present invention is to provide a case for a single cell having a thermal barrier layer/coating on a hard aluminum substrate/aluminum laminate film, wherein the coating may effectively act as a thermal barrier to protect the single cell.

In another aspect, an object of the present invention is to provide a single cell comprising the case having a thermal barrier layer according to the present invention, which may be suppressed from melting when the cell goes thermal runaway.

To achieve the above purpose, in one aspect, there is provided a case having a thermal barrier layer for a single cell, comprising a substrate and a double-layer structure coating on the substrate, wherein the double-layer structure coating includes an inner layer proximal to the substrate, containing an aerogel material which has a ultra-low thermal conductivity, such as 25 mW/m-K or less, and an outer layer distal to the substrate and coated on the inner layer, containing a barrier material which may prevent an electrolyte solvent from permeating into the inner layer.

Preferably, the substrate comprises or consists of a hard aluminum case or a soft aluminum laminate film.

Preferably, the inner layer consists of an aerogel material having a thermal conductivity of 25 mW/m-K or less.

Preferably, the outer layer has a barrier material such as polyethylene terephthalate (PET) or polytetrafluoroethylene (PTFE).

There is also provided a single cell comprising a jelly roll including a cathode, an anode, a separator between the cathode and anode and an electrolyte, and a case accommodating the jelly roll, wherein the case is defined according to the present invention.

There is also provided a cell pack comprising a plurality of the single cell according to the present invention.

According to present invention, the case for a single cell with a double-layer structure coating on a substrate such as aluminum case or aluminum laminate film can avoid melting when the single cell goes thermal runaway, and can solve the problem of thermal propagation between cells.

BRIEF DESCRIPTION FOR THE DRAWINGS

The accompanying drawings, which are included to provide a further understanding of the invention and are incorporated as a part of this specification, illustrate embodiments of the invention and together with the description serve to explain the principles of the invention. In the drawings:

FIG. 1 is a schematic graph illustrating the case for a pouch single cell according to the present invention, wherein FIG. 1(a) is a plane view of a pouch single cell, FIG. 1(b) is a cross-section view of the pouch single cell along the X-X cross section as indicated in FIG. 1(a), and FIG. 1(c) is a cross-section view of the pouch single cell along the Y-Y cross section as indicated in FIG. 1(a).

FIG. 2 is a schematic graph illustrating the case for a prismatic single cell according to the present invention, wherein FIG. 2(a) is a plane view of a prismatic single cell, FIG. 2(b) is a cross-section view of the prismatic single cell along the X-X cross section as indicated in FIG. 2(a), and FIG. 2(c) is a cross-section view of the prismatic single cell along the Y-Y cross section as indicated in FIG. 2(a).

MODES FOR CARRYING OUT THE INVENTION

Hereinafter, embodiments of the present invention will be described in detail with reference to the accompanying drawings such that the technical idea of the present invention can be easily realized by those skilled in the art. It should be understood that the present invention is not limited to the following embodiments and may be embodied in different ways.

As above described, in one aspect, there is provided a case having a thermal barrier layer for a single cell, comprising a substrate and a double-layer structure coating on the substrate, wherein the double-layer structure coating includes an inner layer proximal to the substrate, containing an aerogel material which has an ultra-low thermal conductivity, such as 25 mW/m-K or less, preferably 5 mW/m-K or less, and an outer layer distal to the substrate and coated on the inner layer, containing a barrier material which may prevent an electrolyte solvent from permeating into the inner layer.

In the following, the case according to the present invention may be also referred as "a composite case".

According to the present invention, the case having a thermal barrier layer may be used in a single cell having a hard metal case (a prismatic cell) or a soft case (a pouch cell). That is to say, the substrate of the case may be a hard metal material such as an aluminum case, or a soft material such as an aluminum laminate film.

Figure 1:
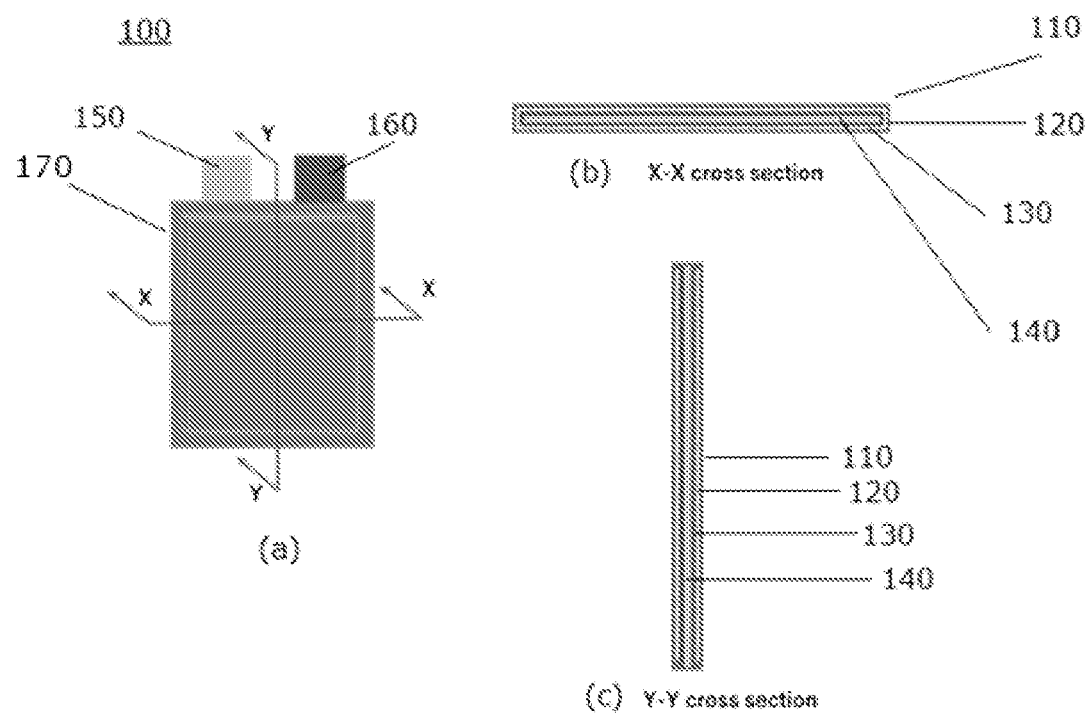
Figure 2:
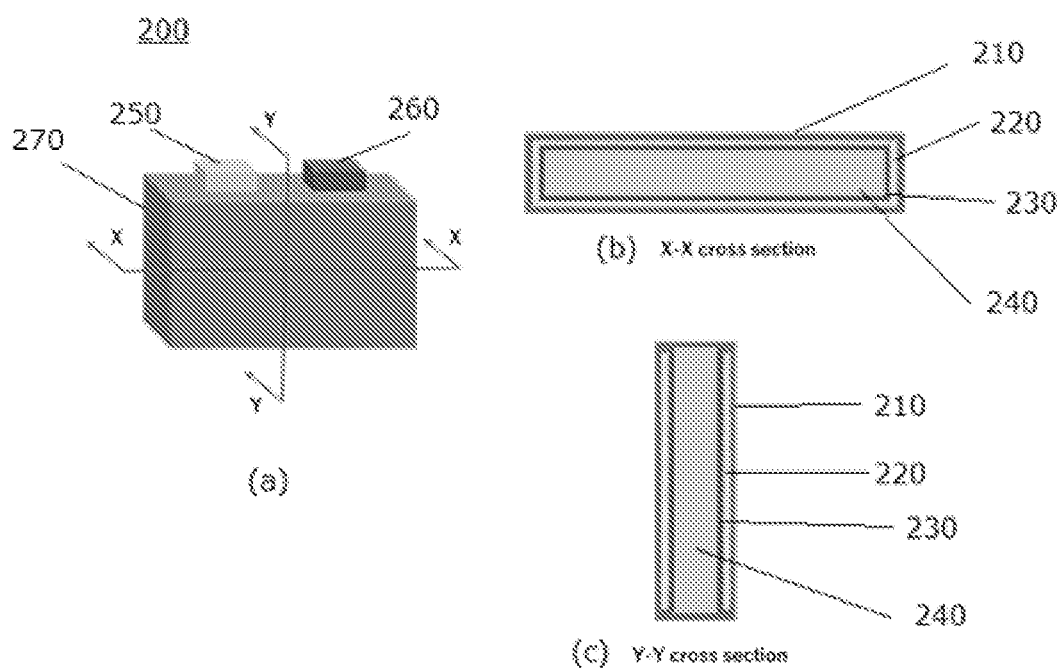

FIGS. 1 and 2 illustrates the composite case for a single cell according to the present invention in a pouch cell and a prismatic cell, respectively.

Referring to FIG. 1(a), a pouch cell 100 is provided with a composite case 170 according to the present invention and an anode tab 150 and a cathode tab 160, as seen from its external view. The jelly roll containing an anode, a cathode, a separator and electrolyte is contained in the case 170. Here, as shown in FIGS. 1(b) and 1(c), a jelly roll 140 is contained in the cell.

The pouch cell 100 may have a size commonly used in the art, for example, when used in a medium-to-large device, the pouch cell 100 may have a length of about 261 mm, and a width of about 216 mm.

Typically, multiple pouch cells of, for example, above sizes may be fixed in a metal frame as a module, such as a module that includes 2 to 10 pouch cells. Further, a battery pack usually consists of several such modules. The pouch cell is characterized by a higher weight energy density due to its lighter packaging material. The pouch cell also has a flexible design in its shape.

As shown in FIGS. 1(b) and 1(c), the case 170 according to the present invention comprises a substrate 110, an inner layer 120 proximal to the substrate, and an outer layer 130 distal to the substrate and coated on the inner layer. As above described, the inner layer 120 and outer layer 130 forms the double-layer structure coating in the present invention.

Similarly, referring to FIG. 2(a), a prismatic cell 200 is provided with a composite case 270 according to the present invention and an anode tab 250 and a cathode tab 260, as seen from its external view. A cell jelly roll is contained in the case 270, as shown in FIGS. 2(b) and 2(c). The prismatic cell 200 may have a size commonly used in the art, for example, it may have a length of about 148 mm, a width of about 91 mm, and a thickness of about 26.5 mm.

The prismatic battery is characterized by its high reliability due to the protection of a hard case, such as an aluminum shell, and also by its high cell-to-pack ratio when forming a pack therefrom, generally reaching 40% or more. In addition, since the prismatic battery is provided with a relief valve through which hot gases can be diverted, an improved safety, even for the whole pack, is obtained. However, the prismatic battery also has disadvantages of lower weight-and-volume-energy density, especially the weight-energy density, due to the larger weight and volume of the aluminum shell.

Further, as shown in FIGS. 2(b) and 2(c), the case 270 according to the present invention comprises a substrate 210, an inner layer 220 proximal to the substrate, and an outer layer 230 distal to the substrate and coated on the inner layer. The inner layer 220 and outer layer 230 forms the double-layer structure coating in the present invention.

According to the present invention, the double-layer structure coating is not necessarily coated on the whole surface (inner surface) of the substrate, as seen from FIGS. 1 and 2. For example, it may be coated on some of the inner surface of a single cell based on different thermal management design. Preferably, the double-layer structure coating is coated on the all of vertical walls without coating on the top and bottom sides. For example, as shown in FIGS. 1 and 2, the double-layer structure coating is coated on the four vertical walls of the pouch or prismatic cell cases. However, in a pouch cell, the double-layer structure coating is especially important, because it is impossible to control the venting direction, and the double-layer structure coating may prevent the aluminum substrate from melting directly, and further prevent the thermal runaway of the neighbor pouch cell in a pack caused by the hot gas escaped from the one of which the aluminum substrate is melted.

Besides the double-layer structure coating, an additional layer such as an adhesive layer may be present on the substrate. In a specific embodiment of the present invention, an adhesive layer may be disposed between the double-layer structure coating and the substrate to improve adhesion of the inner layer onto the substrate. The adhesive layer may comprise an adhesive agent which may be bonded to the substrate via heating or pressure. There is no particular limit to the adhesive used in the adhesive layer as long as it can ensure a satisfactory adhesion between the inner layer and the substrate. For example, specific examples of an adhesive agent which is thermally bonded include polyolefins such as polyethylene or polypropylene, while an adhesive agent which is pressure sensitive may be an acrylic-based binder, a rubber or a silicone.

Next, the composite case according to the present invention is described in detail by reference to FIGS. 1 and 2. As above described, the composite case comprises a substrate and a double-layer structure coating on the substrate.

Regarding the substrate, it may be a relatively soft substrate 110 in a pouch cell, or a hard metal substrate 210 in a prismatic cell. The hard metal substrate 210 is not particularly limited in the present invention, but any hard metal material, such as aluminum or its alloy, SUS or Fe, may be used as long as it may satisfy the requirements for a prismatic cell. Similarly, the soft substrate 110 is also not particularly limited in the present invention, but any soft material such as an aluminum laminate film may be used as long as it may satisfy the requirements for a pouch cell. Generally, the aluminum laminate film comprises a thin aluminum substrate such as an Al (or Al alloy) foil and one or more layers of polymer materials on one or both sides of the substrate. For example, the aluminum laminate film may have a multiple-layer structure, in which an upper layer consists of a 12 μm thick nylon, an interlayer consists of a 40 μm thick Al—Fe alloy, and a lower layer consists of a 14 μm thick casted polypropylene (CPP).

Next, a double-layer structure coating may be formed on the substrate as a thermal barrier and an electrolyte-solvent barrier. The double-layer structure coating may be formed by applying an inner layer having an ultra-low thermal conductivity on the substrate and then coating an outer layer onto the inner layer. Optionally, the double-layer structure coating may be applied onto the substrate by bonding the inner layer of the double-layer structure coating via an adhesive layer.

The inner layer is proximal to the substrate and contains an aerogel material, thus it may be referred as "aerogel layer" in the present invention. An aerogel material refers to a highly porous solid material composed of colloidal particles or organic polymer molecules linked to each other to form a nano-porous spatial network structure which has pores filled with gas generally. Thus, it has a special continuous irregular network structure. Because an aerogel material has nano particles and a large amount of pores as dispersed therein, it has a very low thermal conductivity. The reason is believed as follows. It is known that the thermal conduction is operated mainly by three ways of gas conduction, solid conduction and radiative conduction. Among these, gas conduction has the least amount of heat that can be transferred since most of gases have a very low thermal conductivity. Thus, it is common that most thermal insulation materials have a porous structure in which air occupies partial volume of a solid material so that the whole thermal conductivity of the material can be lowered down.

The aerogel material according to the present invention has a high porosity, which may be expressed in terms of air volumetric percentage (%). In some embodiments, the aerogel material can have an air volumetric percentage of larger than 95%, preferably larger than 97% and more preferably than 99%. In some embodiments, the aerogel material may have a pore size of 100 nm or less, more preferably 50 nm or less, most preferably 10 nm or less.

The aerogel layer according to the present invention may have a thickness of about 100 μm or more, preferably about 300 μm or more, and more preferably about 500 μm or more. If the thickness is less than 100 μm, a desired thermal barrier effect may be not obtained. The upper limit for the thickness is not specifically limited, but preferably 1500 μm or less, more preferably 1000 μm or less, in view of its matching to the single cell.

As above described, the aerogel material according to the present invention has a thermal conductivity of 25 mW/m-K or less, preferably 5 mW/m-K or less. If the thermal conductivity is larger than 25 mW/m-K, a desired thermal barrier effect may be not obtained.

In some embodiments, the aerogel material can be made from a nano-size material selected from silica, titanium oxide, chrome oxide, iron oxide, vandia, neodymium oxide, samaria, holmia, carbon (including carbon nanotubes), or any other metal oxide, or any combination thereof. More preferably, the aerogel material is made from silica, titanium oxide, carbon or any combination thereof. Most preferably, the aerogel material is made from silica. Here, the term "nano size" means that the material has a particle size in a nano scale, such as a particle size of 500 nm or less, preferably 100 nm or less, more preferably 50 nm or less.

In other embodiments, the aerogel material contains the above-listed aerogel-forming materials as the main components and additives. In the case that an additive is included, the aerogel material may contain about 60% to 90% by weight of the aerogel-forming material, based on the total weight of the aerogel material. The additives may function to enhance the structure stability or cohesion of the aerogel material, or provide other physical benefits. For example, the aerogel material may include glass fibers as a binder to give the composite material with proper mechanical strength, such as glass fibers with the length of 10 μm to 2 mm. In addition, radiative thermal conduction may occur, especially at high temperature. Thus, usually the aerogel material may include opacifiers such as SiC, $TiO_2$ or carbon black to stop the heat radiation. The opacifier may be in a form of single crystal or multi-crystal. The opacifier may be in a form of particle and may have a particle size of 1 μm to 50 μm. The particle size can be measure by a laser particle size analyzer such as HORIBA LA-960. Here, the particle size may refer to a secondary particle size of multi-crystal particles.

In some embodiments, the aerogel material according to the present invention may contain about 60% to 90% by weight of the aerogel-forming material (such as $SiO_2$ having a particle size of 10 nm or a combination of nano-size $SiO_2$ and nano-size $TiO_2$), 5% to 30% by weight of SiC having a particle size of such as 20 μm and 2% to 10% by weight of glass fiber with a length of 100 μm, based on the total weight of the aerogel material.

The aerogel material according to the present invention may not only provide an ultra-low thermal conduction with a low thickness, but also have advantages such as low light weight and high thermal stability, thus can be useful in the present invention.

The aerogel is usually made of so-gel polymerization, in which monomers for forming the frame of the aerogel react with each other to form a sol that consists of bonded, cross linked macromolecules, with deposits of liquid solution filling the pores within the macromolecules.

Then, when the resultant is subjected to supercritical drying under a supercritical condition. The supercritical condition is not particularly limited and the supercritical drying may be conducted at a condition commonly used in the art. For example, the aged gel may be incubated at supercritical temperature above the critical temperature of a supercritical drying medium to obtain an aerogel. The supercritical drying medium may be selected from carbon dioxide, methanol or ethanol, and may be preferably carbon dioxide. The supercritical drying may be conducted at a supercritical temperature of 30 to 60° C., preferably of 40 to 45° C., under a pressure of 1.01 MPa or more (preferably 5.06 MPa or more, more preferably 7.38 MPa or more), over a holding time of 2 to 5 h, preferably 2 to 3 h.

During the supercritical drying, the liquid solution is evaporated out and a bonded, cross linked macromolecule frame is left behind. In order to have low solid conduction, the resultant should have a small particle size (5 to 20 nm) which enable high contact resistance and tortuous heat path through the sold matrix. This decreases the rate at which heat can flow by solid conduction. Regarding to the gas conduction, since the nanomaterials (such as fumed $SiO_2$) has a pore size less than the average free transportation path of air molecular (74 nm), it may have low convective heat transfer.

In addition, the aerogel material according to the present invention has an extremely low shrinkage at a high temperature. For example, the aerogel material may have a shrinkage of less than 0.5%, preferably less than 0.1% and more preferably about 0%, after it is heated at 600° C. for 24 hours. Furthermore, the aerogel material may have a shrinkage of less than 2%, preferably less than 1.5% and more preferably less than 1%, after it is heated at 900° C. for 24 hours.

According to the present invention, the aerogel material may be deformed when it is subjected to a compression force applied by the neighbor cells due to thermal expansion during operation of a battery. Specifically, the aerogel material according to the present invention has a compression set of 10% or more, preferably 10% to 15%, in a compression experiment in which a load of 10 kg (5×5 $mm^2$) is applied to a test piece having a size of 3×3 $mm^2$ and a thickness of 1 mm for 1 h.

The formation of the aerogel material involves a solution for forming the aerogel material, which contains monomers for forming the frame of the aerogel, a solvent and optionally additives as above described.

The solvent for forming the aerogel material is not particularly limited, and any solvent for forming an aerogel as commonly used in the art can be used. For example, the solvent may be an aqueous liquid such as water or water/ethanol mixture, or an organic solvent such as propylene carbonate, ethylene carbonate, diethylene carbonate, dimethyl carbonate, or an ionic liquid such as 1-ethyl-3-methylimidazolium bis[(trifluoromethyl)sulfonyl]amide.

The aerogel material may be formed in a process as below comprising the following steps:

(1) forming a stable solution of a precursor for forming the aerosol, wherein the solution may be a stable solution of a precursor, optionally an opacifier and a binder as above described;

(2) gelating the solution via a polycondensation reaction, for example, by changing pH of the solution to 3-4 with an alkaline solution such as NaOH or KOH;

(3) aging the sol as obtained in step (2) at a predetermined temperature; and (4) subjecting the aged gel to a supercritical drying under a supercritical condition and shaping it into the desired form or shape.

By the above steps (1) to (4), an aerogel material having the desired porosity and thickness can be obtained, and may be applied to the substrate via a common process to form the aerogel layer. Alternatively, the aerogel layer may be firstly combined with the outer layer as below described, and then the combined coating may be coated on the substrate in a single cell.

Next, an outer layer may be coated on the aerogel layer as a barrier which may prevent an electrolyte solvent from permeating into the inner layer. The outer layer may be also referred as a "electrolyte-solvent barrier layer" in the present invention.

The barrier material in the outer layer is not particularly limited as long as it can prevent an electrolyte solvent from permeating into the inner layer. Generally, the barrier material includes a polymer material which would not be dissolved in the solvent of the electrolyte and would not be much swelled when contacting with the electrolyte. Specific examples thereof include barrier polymers such as polyethylene terephthalate (PET), polytetrafluoroethylene (PTFE), polypropylene, polyethylene, polyimide or polyisobutylene, which may be used alone or in combination of two or more thereof. Among those, PET and PTFE are preferred in terms of an effect to prevent an electrolyte solvent from permeating into the inner layer.

In addition, the polymer material is used to ensure that the solvent does not come into contact with the porous aerogel material under normal conditions during its operation. It is also important for the polymer material to be not affected in terms of its thermal insulation property when the battery goes thermal runaway. Thus, in some embodiments, it is preferable to use a polymer material having a melting point (MP) of 150° C. or more, preferably 200° C. or more, and more preferably 300° C. or more, if a better effect is desired.

Further, regarding the electrolyte in the cell, it generally comprises a solvent and a lithium salt dissolved in the solvent. The electrolyte solvent is not particular limited, but any solvent typically used in the art may be used in the present invention. For example, the solvent may be an organic solvent such as ether, ester, amide, linear carbonate, cyclic carbonate and the like, which may be used alone or in combination of two or more thereof. For example, the electrolyte solvent may contain a mixture of a linear carbonate such as diethyl carbonate and a cyclic carbonate such as ethylene carbonate.

The lithium salt in the electrolyte is not particularly limited, but any lithium salt commonly used in the art may be used in the present invention. For example, the lithium salt may be $LiPF_6$ in some embodiments according to the present invention.

The electrolyte-solvent barrier layer may be coated on the aerogel layer by a conventional coating method, such as spray coating, spin coating, thermal evaporation or the like. For example, a raw material of the barrier polymer such as PET or PTFE may be mixed uniformly, coated on the aerogel layer, and dried to obtain the electrolyte-solvent barrier layer. If a curing process is involved, an optional cross-linking agent may be added to obtain the barrier polymer.

The thickness of the electrolyte-solvent barrier layer is not particularly limited in the present invention as long as the barrier layer can prevent an electrolyte solvent from permeating into the inner layer. However, in view of sufficient barrier effect and easy manufacture, the thickness of electrolyte-solvent barrier layer may be in a range of 100 nm to 500 μm, preferably 1 to 50 μm.

With the above configuration, the composite case for a single cell can avoid melting when the single cell goes thermal runaway by providing an aerogel layer as a thermal barrier on the inner side of the case substrate to remarkably reduce the heat amount transferred to the case substrate, and an electrolyte-solvent barrier layer to protect the functional thermal barrier from being damage by the organic solvent in the cell.

In addition, on the other side of the case substrate (i.e. the external side), opposite to the side formed with the double-layer structure coating, an additional layer such as a protection layer may be formed. Of course, the external side may be not subjected to any coating process in order to improve the thermal conduction.

According to the present invention, in the other aspect, a single cell is provided comprising a jelly roll including a cathode, an anode, a separator between the cathode and anode and an electrolyte, and a case accommodating the jelly roll, wherein the case is defined according to the present invention.

Specifically, the present invention provides a pouch single cell comprising the jelly roll as above defined and a soft case accommodating the jelly roll, wherein the case is defined according to the present invention, and the substrate is a relatively soft material such as an aluminum laminate film.

In addition, the present invention provides a prismatic single cell comprising the jelly roll as above defined and a hard case accommodating the jelly roll, wherein the case is defined according to the present invention, and the substrate is a hard metal material such as an aluminum case.

The cathode, the anode and the separator in the single cell are not particularly limited in terms of shape and material thereof, but any composition and configuration typically used in the art may be used in the present invention.

According to the present invention, a cell pack is provided comprising a plurality of the single cell according to the present invention.

According to the present invention, a battery is provided comprising the cell pack according to the present invention. Moreover, a device is provided comprising the battery according to the present invention. The battery is used as a power supply of the device. For example, the device may be one or more of electric vehicles including electric vehicles (EV), hybrid electric vehicles (HEV) or plug-in hybrid electric vehicles (PHEV).

EXAMPLES

Hereinafter, the embodiments are described in detail using examples but are not limited by the examples.
<Measurement of Shrinkage>
Sample 1
Preparation of a $SiO_2/TiO_2$ Aerogel
A $SiO_2/TiO_2$ aerogel is prepared by the steps (1) to (4) as follows:

(1). First, 4 g $Na_4SiO_4$ (Sigma Aldrich) and 3 g $Na_2Ti_3O_7$ (Sigma Aldrich) having a nano size were weighed and added to 100 ml of distilled water, stirred well to prepare a stable aqueous solution of $Na_4SiO_4$ and $Na_2Ti_3O_7$.

(2). An alkaline solution (1 M KOH, Sigma Aldrich) was slowly added into the stable solution to adjust pH of the stable solution to 3.5 to form a $SiO_2/TiO_2$ sol.

(3). The obtained $SiO_2/TiO_2$ sol was aged in water for 10 h to form a gel.

(4). The aged gel was incubated in a supercritical $CO_2$ medium at a supercritical temperature of 50° C. for 2 h to form a $SiO_2/TiO_2$ aerogel.

By the above steps (1) to (4), an aerogel containing 72 wt % of $SiO_2/TiO_2$ was obtained. In addition, 25 wt % of SiC (opacifier, Sigma Aldrich, 378097) and 3 wt % of glass fiber (binder, Asashi Kasei, PA66) was also added in step (1). The obtained $SiO_2/TiO_2$ aerogel was formed to have a thickness of 0.3 mm.

Sample 2
A $SiO_2/TiO_2$ aerogel was prepared in the same manner as that for Sample 1, except that the aerogel contains 63 wt % of $SiO_2/TiO_2$, 34 wt % of SiC and 3 wt % of glass fiber.
Test
The obtained aerogel, samples 1 and 2, was subjected to the shrinkage measurement according to ASTM C356 and the dedicated "in-house" techniques. In this method of "full soak" exposure, the tested materials were completely immersed and heated to 100° C., 600° C., 900° C. for a period of 24 hours, respectively, after which the dimensional changes are measured. The results for Samples 1 and 2 are shown in Table 1.

TABLE 1

Results of shrinkage for Samples 1 and 2

|  | Temperature (° C.) | Shrinkage (%) |
| --- | --- | --- |
| Sample 1 | 100 | 0 |
|  | 600 | 0 |
|  | 900 | 1 |
| Sample 2 | 100 | 0 |
|  | 600 | 0 |
|  | 900 | 1.7 |

As shown in Table 1, the $SiO_2/TiO_2$ aerogels according to Samples 1 and 2 show an extremely low shrinkage at a high temperature. For example, the aerogels exhibit no shrinkage (0%) after they are heated at 100° C. and 600° C. for 24 hours in Samples 1 and 2. Even at a higher temperature of 900° C., the aerogel exhibits a shrinkage of 1.7% at most in Sample 2, after it is heated for 24 hours. As commonly known, as the temperature increases, the particles of $SiO_2/TiO_2$ begin to sinter and fuse together, changing the nature of the structure and increasing the solid conduction component of heat transfer. However, With the microporous insulation structure according to the present invention, an extremely low shrinkage may be obtained, which would rarely have any influence on the effective performance when used in a single cell.

Comparative Example 1

A pouch cell (250 Wh/kg, 550 Wh/L) having only an aluminum laminate film (SPALF manufactured by Showa Denko, having a structure from outside to inside of: nylon, 25 μm-adhesive, 4 μm-aluminum foil, 40 μm-adhesive, 4 μm-CPP, 30 μm) as its case was forced to have thermal runaway. The behavior of aluminum laminate film during the thermal runaway was observed.

The pouch cell having a shape as shown in FIG. 1(a) is prepared, which has a size of 261 mm in length and 216 mm in width and has an electrolyte solution of 1 M $LiPF_6$ in a mixed solvent of EC:DEC (3:7). Here, EC refers to ethylene carbonate, while DEC refers to diethyl carbonate. The result of Comparative Example 1 is shown in Table 2.

Example 1

A $SiO_2/TiO_2$ aerogel was prepared in the same manner as that for Sample 1, that is, the $SiO_2/TiO_2$ aerogel comprises 72 wt % of $SiO_2/TiO_2$, 25 wt % of SiC and 3 wt % of glass fiber. The obtained $SiO_2/TiO_2$ aerogel was formed to have a thickness of 0.3 mm.

A PET polymer available from Sigma Aldrich (429252) was used as received. The PET polymer was coated on the $SiO_2/TiO_2$ aerogel layer by a hot spaying method at 300° C. to form a PET layer having a thickness of 10 μm.

The obtained double-layer structure coating was coated via an adhesive layer on the surface inside of the aluminum laminate film in a pouch cell (250 Wh/kg, 550 Wh/L) as shown in FIG. 1. The pouch cell has a size of 261 mm in length and 216 mm in width and has an electrolyte solution of 1 M $LiPF_6$ in a mixed solvent of EC:DEC (3:7).

The pouch cell was forced to have thermal runaway. The behavior of the composite case during the thermal runaway was observed. The result of Example 1 is shown in Table 2.

Example 2

The double-layer structure coating was prepared by the same process as that described in Example 1, except that the $SiO_2/TiO_2$ aerogel was prepared to have a thickness of 0.5 mm.

The obtained double-layer structure coating was coated via an adhesive layer on the surface inside of a pouch cell (250 Wh/kg, 550 Wh/L) as shown in FIG. 1. The pouch cell has a size of 261 mm in length and 216 mm in width and has an electrolyte solution of 1 M $LiPF_6$ in a mixed solvent of EC:DEC (3:7).

The pouch cell was forced to have thermal runaway. The behavior of the composite case during the thermal runaway was observed. The result of Example 2 is shown in Table 2.

TABLE 2

The results of melting test for Comparative Example 1, Example 1 and Example 2.

| Examples | Thickness of multi-layer composite material | Situation of aluminum laminate film |
| --- | --- | --- |
| Comparative example 1 | 0 mm | Melting occur |
| Example 1 | 0.31 mm | No melting |
| Example 2 | 0.51 mm | No melting |

Seen from Table 2, as compared with the Comparative Example 1 having only an aluminum laminate film, the use of double-layer structure coating according to the present invention may prevent the aluminum laminate film from melting during the thermal runaway in Examples 1 and 2. Therefore, it can be concluded that the composite case according to the present invention may prevent the aluminum laminate film in a pouch cell from melting during the thermal runaway, and is helpful to stop the thermal propagation between cells.

Comparative Example 2

Figure 3:
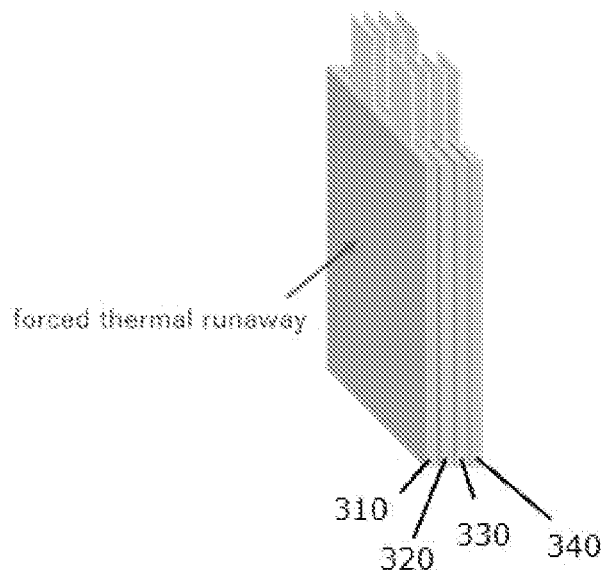
FIG. 3 is a perspective view schematically illustrating the structure of a cell pack comprising pouch cells for test in Comparative Example 2 and Examples 3 to 4.

The single cell as prepared in Comparative Example 1 is used. FIG. 3 is a perspective view schematically illustrating the structure of a cell pack comprising pouch cells for test. As shown in FIG. 3, a cell pack 300 with 4 pouch cells (250 Wh/kg, 550 Wh/L) was used as test vehicle. Cell 1, cell 2, cell 3 and cell 4 are designated to 310, 320, 330 and 340 in FIG. 3, and arranged parallelly. No spacer is disposed between the adjacent pouch cells.

In the test, cell 1 was forced to have thermal runaway. The waiting times to thermal runaway of the rest of the cells were recorded. The 4 pouch cells were placed in a sufficiently large open space, so that the hot gas from the cell having thermal runaway would not affect the neighboring cells. As a result, the neighboring cells can only be ignited by the direct thermal transfer from the cell having thermal runaway. The result of Comparative Example 2 is shown in Table 3.

Example 3

The double-layer structure coating was prepared by the same process as that described in Example 1. The obtained double-layer structure coating was coated on a surface inside of a pouch cell (250 Wh/kg, 550 Wh/L) to obtain a composite case for pouch cells as shown in FIG. 1.

The thermal runaway test as described in Comparative Example 2 is conducted here for the composite case. Cell 1 is forced to have thermal runaway. The waiting time to thermal runaway of the rest of the cells are recorded. The result of Example 3 is shown in Table 3.

Example 4

The double-layer structure coating was prepared by the same process as that described in Example 1, except that the $SiO_2/TiO_2$ aerogel was prepared to have a thickness of 0.5 mm.

The obtained double-layer structure coating was coated via an adhesive layer on the surface inside of a pouch cell (250 Wh/kg, 550 Wh/L) to obtain the composite case as shown in FIG. 1. The pouch cell has an electrolyte solution of 1 M $LiPF_6$ in a mixed solvent of EC:DEC (3:7).

The thermal runaway test as described in Comparative Example 2 is conducted here for the composite case. Cell 1 is forced to have thermal runaway. The waiting time to thermal runaway of the rest of the cells are recorded. The result of Example 4 is shown in Table 3.

TABLE 3

The results of thermal runaway test for Comparative Example 2, Example 3 and Example 4.

| Examples | Thickness of multilayer composition material | Time to thermal runaway | | |
| --- | --- | --- | --- | --- |
| | | Cell 2 | Cell 3 | Cell 4 |
| Comparative example 2 | 0 mm | 1 m 8 s | 2 m 35 s | 3 m 49 s |
| Example 3 | 0.31 mm | 9 m 46 s | 22 m 37 s | 33 m 52 s |
| Example 4 | 0.51 mm | 15 m 53 s | 38 m 29 s | / |

As can be seen from table 3, as compared with Comparative Example 2, Example 3 containing the double-layer structure coating may improve largely the waiting time to thermal runaway for Cells 2, 3 and 4. The use of an aerogel material as a thermal barrier is proved to be effective to substantially alleviate the thermal propagation between cells. When the aerogel layer has a thickness of 0.5 mm or more, as shown in Example 4, the Cell 4 may be prevented from thermal runaway over time. Thus, it can be seen from table 3 that the composite case according to the present invention may have excellent thermal insulation effect and stop the thermal propagation between cells during thermal runaway in the cell pack.

Comparative Example 3

A prismatic cell (230 Wh/kg, 560 Wh/L) having only an aluminum case as its case was forced to have thermal runaway. The behavior of the aluminum case during the thermal runaway was observed. The prismatic cell has a size of 148 mm in length, 91 mm in width and 26.5 mm in thickness, and has an electrolyte solution of 1 M $LiPF_6$ in a mixed solvent of EC:DEC (3:7). The result of Comparative Example 3 is shown in Table 4.

Example 5

The double-layer structure coating was prepared by the same process as that described in Example 1. The obtained double-layer structure coating was coated on a surface inside of a prismatic cell (230 Wh/kg, 560 Wh/L) to obtain a composite case for prismatic cells as shown in FIG. 2. The prismatic cell has a size of 148 mm in length, 91 mm in width and 26.5 mm in thickness, and has an electrolyte solution of 1 M $LiPF_6$ in a mixed solvent of EC:DEC (3:7).

The prismatic cell was forced to have thermal runaway. The behavior of the composite case during the thermal runaway was observed. The result of Example 5 is shown in Table 4.

Example 6

The double-layer structure coating was prepared by the same process as that described in Example 1, except that the $SiO_2/TiO_2$ aerogel was prepared to have a thickness of 0.5 mm.

The obtained double-layer structure coating was coated via an adhesive layer on the surface inside of a prismatic cell (230 Wh/kg, 560 Wh/L) to obtain the composite case as shown in FIG. 2. The prismatic cell has a size of 148 mm in length, 91 mm in width and 26.5 mm in thickness, and has an electrolyte solution of 1 M $LiPF_6$ in a mixed solvent of EC:DEC (3:7).

The prismatic cell was forced to have thermal runaway. The behavior of the composite case during the thermal runaway was observed. The result of Example 6 is shown in Table 4.

TABLE 4

The results of melting test for Comparative Example 3, Example 5 and Example 6.

| Examples | Thickness of multi-layer composite material | Situation of aluminum laminate film |
|---|---|---|
| Comparative example 3 | 0 mm | Melting occur |
| Example 5 | 0.31 mm | No melting |
| Example 6 | 0.51 mm | No melting |

Seen from Table 4, like the case regarding the pouch cells, the use of double-layer structure coating according to the present invention may prevent the aluminum case from melting during the thermal runaway in Examples 5 and 6. Therefore, it can be concluded that the composite case according to the present invention may prevent the aluminum case in a prismatic cell from melting during the thermal runaway, and is helpful to stop the thermal propagation between cells.

Comparative Example 4

The single cell as prepared in Comparative Example 3 is used.

Figure 4:
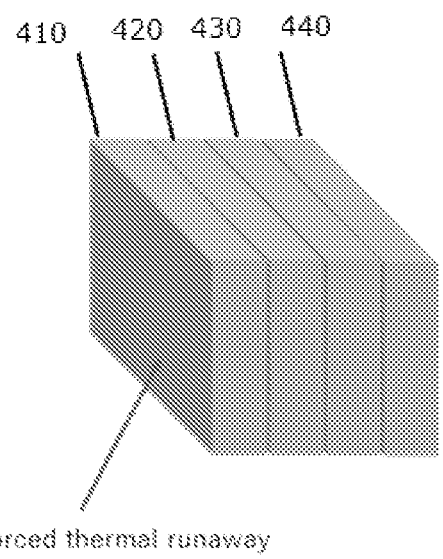
FIG. 4 is a perspective view schematically illustrating the structure of a cell pack comprising prismatic cells for test in Comparative Example 4 and Examples 7 to 8.

FIG. 4 is a perspective view schematically illustrating the structure of a cell pack comprising prismatic cells for test. As shown in FIG. 4, a cell pack 300 with 4 prismatic cells (230 Wh/kg, 560 Wh/L) was used as test vehicle. Cell 1, cell 2, cell 3 and cell 4 are designated to 410, 420, 430 and 440 in FIG. 4, and arranged parallelly. No spacer is disposed between the adjacent prismatic cells.

In the test, cell 1 was forced to have thermal runaway. The waiting times to thermal runaway of the rest of the cells were recorded. The 4 prismatic cells were placed in a sufficiently large open space, so that the hot gas from the cell having thermal runaway would not affect the neighboring cells. As a result, the neighboring cells can only be ignited by the direct thermal transfer from the cell having thermal runaway. The result of Comparative Example 4 is shown in Table 5.

Example 7

The double-layer structure coating was prepared by the same process as that described in Example 1. The obtained double-layer structure coating was coated via an adhesive layer on a surface inside of a prismatic cell (230 Wh/kg, 560 Wh/L) to obtain a composite case for prismatic cells as shown in FIG. 2. The prismatic cell has a size of 148 mm in length, 91 mm in width and 26.5 mm in thickness, and has an electrolyte solution of 1 M $LiPF_6$ in a mixed solvent of EC:DEC (3:7).

The thermal runaway test as described in Comparative Example 4 is conducted here for the composite case. Cell 1 is forced to have thermal runaway. The waiting time to thermal runaway of the rest of the cells are recorded. The result of Example 7 is shown in Table 5.

Example 8

The double-layer structure coating was prepared by the same process as that described in Example 1, except that the $SiO_2/TiO_2$ aerogel was prepared to have a thickness of 0.5 mm.

The obtained double-layer structure coating was coated via an adhesive layer on the surface inside of a prismatic cell (230 Wh/kg, 560 Wh/L) to obtain the composite case as shown in FIG. 2. The prismatic cell has a size of 148 mm in length, 91 mm in width and 26.5 mm in thickness, and has an electrolyte solution of 1 M $LiPF_6$ in a mixed solvent of EC:DEC (3:7).

The thermal runaway test as described in Comparative Example 4 is conducted here for the composite case. Cell 1 is forced to have thermal runaway. The waiting time to thermal runaway of the rest of the cells are recorded. The result of Example 8 is shown in Table 5.

TABLE 5

The results of thermal runaway test for Comparative Example 4, Example 7 and Example 8.

| Examples | Thickness of multilayer composition material | Time to thermal runaway | | |
|---|---|---|---|---|
| | | Cell 2 | Cell 3 | Cell 4 |
| Comparative example 4 | 0 mm | 2 m 38 s | 5 m 3 s | 8 m 56 s |
| Example 7 | 0.35 mm | 10 m 16 s | 24 m 4 s | / |
| Example 8 | 0.55 mm | 17 m 35 s | / | / |

As can be seen from table 5, like the case regarding pouch cells, Example 7 containing the double-layer structure coating may improve largely the waiting time to thermal runaway for Cells 2, 3 and 4. The use of an aerogel material as a thermal barrier is proved to be effective to substantially alleviate the thermal propagation between cells. When the aerogel layer has a thickness of 0.5 mm or more, as shown in Example 4, the Cell 4 may be prevented from thermal runaway over time. Thus, it can be seen from table 3 that the composite case according to the present invention may have excellent thermal insulation effect and stop the thermal propagation between cells during thermal runaway in the cell pack.

While specific embodiments of the present invention have been described above, various applications and modifications will become readily apparent to those skilled in the art without departing from the scope of the present invention.

The invention claimed is:

1. A case having a thermal barrier layer for a single cell, comprising:
    a substrate and a double-layer structure coating on the substrate, wherein the double-layer structure coating includes:
        an inner layer proximal to the substrate, containing an aerogel material which has a thermal conductivity of 25 mW/m-K or less, and
        an outer layer distal to the substrate and coated on the inner layer, containing a barrier material which may prevent an electrolyte solvent from permeating into the inner layer,
        wherein the inner layer has a thickness of 300 μm or more, and
        wherein the outer layer comprises a barrier polymer selected from polyethylene terephthalate (PET) or polytetrafluoroethylene (PTFE) and has a thickness of 100 nm to 500 μm.

2. The case having a thermal barrier layer for a single cell according to claim 1, wherein the inner layer has a thickness of 500 μm or more.

3. The case having a thermal barrier layer for a single cell according to claim 1, wherein the outer layer has a thickness of 1 μm to 50 μm.

4. The case having a thermal barrier layer for a single cell according to claim 1, wherein the aerogel material contains an opacifier and a binder.

5. The case having a thermal barrier layer for a single cell according to claim 4, wherein the opacifier is SiC, $TiO_2$ or carbon black and the binder is glass fiber.

6. The case having a thermal barrier layer for a single cell according to claim 1, wherein the aerogel material has a shrinkage of less than 2%, after it is heated at 900° C. for 24 hours.

7. The case having a thermal barrier layer for a single cell according to claim 1, wherein the substrate is a metal material.

8. The case having a thermal barrier layer for a single cell according to claim 7, wherein the substrate is aluminum, an aluminum alloy, or an aluminum laminate film.

9. A single cell comprising:
    a jelly roll including:
        a cathode,
        an anode,
        a separator between the cathode and anode, and
        an electrolyte, and
    a case accommodating the jelly roll, wherein the case has
        a thermal barrier layer for a single cell, comprising:
            a substrate and a double-layer structure coating on the substrate, wherein the double-layer structure coating includes:
                an inner layer proximal to the substrate, containing an aerogel material which has a thermal conductivity of 25 mW/m-K or less, and
                an outer layer distal to the substrate and coated on the inner layer, containing a barrier material which may prevent an electrolyte solvent from permeating into the inner layer,
                wherein the inner layer has a thickness of 300 μm or more, and wherein the outer layer comprises a barrier polymer selected from polyethylene terephthalate (PET) or polytetrafluoroethylene (PTFE) and has a thickness of 100 nm to 500 μm.

10. The single cell according to claim 9, wherein the single cell is a pouch cell or a prismatic cell.

11. A cell pack comprising a plurality of single cells according to claim 9.

12. The single cell according to claim 9, wherein the inner layer has a thickness of 500 μm or more.

13. The single cell according to claim 9, wherein the outer layer has a thickness of 1 μm to 50 μm.

14. The single cell according to claim 9, wherein the aerogel material contains an opacifier and a binder.

15. The single cell according to claim 14, wherein the opacifier is SiC, $TiO_2$ or carbon black and the binder is glass fiber.

16. The single cell according to claim 9, wherein the aerogel material has a shrinkage of less than 2%, after it is heated at 900° C. for 24 hours.

17. The single cell according to claim 9, wherein the substrate is a metal material.

18. The single cell according to claim 17, wherein the substrate is aluminum, an aluminum alloy, or an aluminum laminate film.

* * * * *